No. 827,990.   
J. F. OHMER.  
DUPLEX RAILROAD TICKET.  
APPLICATION FILED APR. 29, 1903.

PATENTED AUG. 7, 1906.

3 SHEETS—SHEET 1.

PASSENGERS RECEIPT.
NO. 77.  O.F.R. CO.  Form 07
for one first class continuous ticket returning between stations punched on ticket. THIS RECEIPT must be detached by conductor and returned to passenger to insure ride to destination.
TICKET RECEIPT, NOT GOOD FOR PASSAGE.

NO. 77.  O.F.R. CO.  Form 07
ISSUED March 17 1903.
TO C. M. Theobald
RETURNED March 31 1903.
C. M. Theobald, COND.

| | | | | RETURN TICKET | N / W | E / S | E / S | N / W | RETURN TICKET | | | | | |
|---|---|---|---|---|---|---|---|---|---|---|---|---|---|---|
| JAN | 21 | 11 | 1 | DAYTON | 150 | 5 | 5 | 150 | DAYTON | | 1 | 11 | 21 | JAN |
| FEB | 22 | 12 | 2 | WHITFIELD | 145 | 10 | 10 | 145 | WHITFIELD | | 2 | 12 | 22 | FEB |
| MAR | 23 | 13 | 3 | MIAMISBURG | 140 | 15 | 15 | 140 | MIAMISBURG | | 3 | 13 | 23 | MAR |
| APR | 24 | 14 | 4 | CARLISLE | 135 | 20 | 20 | 135 | CARLISLE | | 4 | 14 | 24 | APR |
| MAY | 25 | 15 | 5 | POSTTOWN | 130 | 25 | 25 | 130 | POST TOWN | | 5 | 15 | 25 | MAY |
| JUNE | 26 | 16 | 6 | MIDDLETOWN | 125 | 30 | 30 | 125 | MIDDLETOWN | | 6 | 16 | 26 | JUNE |
| JULY | 27 | 17 | 7 | TRENTON | 120 | 35 | 35 | 120 | TRENTON | | 7 | 17 | 27 | JULY |
| AUG | 28 | 18 | 8 | OVERPECK | 115 | 40 | 40 | 115 | OVERPECK | | 8 | 18 | 28 | AUG |
| SEPT | 29 | 19 | 9 | HAMILTON | 110 | 45 | 45 | 110 | HAMILTON | | 9 | 19 | 29 | SEPT |
| OCT | 30 | 20 | 10 | LINDENWALD | 105 | 50 | 50 | 105 | LINDENWALD | | 10 | 20 | 30 | OCT |
| NOV | 1904 | 1903 | 31 | SCHENCK | 100 | 55 | 55 | 100 | SCHENCK | | 31 | 1903 | 1904 | NOV |
| DEC | 1907 | 1906 | 1905 | FAIRSMITH | 95 | 60 | 60 | 95 | FAIRSMITH | | 1905 | 1906 | 1907 | DEC |
| FREIGHT | EXPRESS | EXCESS BAGGAGE | HALF FARE | JONES | 90 | 65 | 65 | 90 | JONES | | HALF FARE | EXCESS BAGGAGE | EXPRESS | FREIGHT |
| | | | | CRESTVUE | 85 | 70 | 70 | 85 | CRESTVUE | | | | | |
| | | | | GLENDALE | 80 | 75 | 75 | 80 | GLENDALE | | | | | |
| | | | | WOODLAWN | 75 | 80 | 80 | 75 | WOODLAWN | | | | | |
| | | | | PARK PLACE | 70 | 85 | 85 | 70 | PARK PLACE | | | | | |
| | | | | LOCKLAND | 65 | 90 | 90 | 65 | LOCKLAND | | | | | |
| | | | | WYOMING | 60 | 95 | 95 | 60 | WYOMING | | | | | |
| | | | | MAPLEWOOD | 55 | 100 | 100 | 55 | MAPLEWOOD | | | | | |
| | | | | HARTWELL | 50 | 105 | 105 | 50 | HARTWELL | | | | | |
| | | | | CARTHAGE | 45 | 110 | 110 | 45 | CARTHAGE | | | | | |
| | | | | ELMWOOD | 40 | 115 | 115 | 40 | ELMWOOD | | | | | |
| | | | | IVORYDALE | 35 | 120 | 120 | 35 | IVORYDALE | | | | | |
| | | | | WINTON | 30 | 125 | 125 | 30 | WINTON | | | | | |
| | | | | NORTHSIDE | 25 | 130 | 130 | 25 | NORTHSIDE | | | | | |
| | | | | FAIRMOUNT | 20 | 135 | 135 | 20 | FAIRMOUNT | | | | | |
| | | | | BRIGHTON | 15 | 140 | 140 | 15 | BRIGHTON | | | | | |
| | | | | GEST STREET | 10 | 145 | 145 | 10 | GEST STREET | | | | | |
| | | | | CINCINNATI | 5 | 150 | 150 | 5 | CINCINNATI | | | | | |

WITNESSES:
Matthew Siebler
Carolyn M. Theobald

Fig. 1.

INVENTOR
Jno. F. Ohmer
BY R. J. McCarty
ATTORNEY

No. 827,990. PATENTED AUG. 7, 1906.
J. F. OHMER.
DUPLEX RAILROAD TICKET.
APPLICATION FILED APR. 29, 1903.

3 SHEETS—SHEET 2.

| NO.77 O.F.R. CO. B  Form 07 | NO.77  O.F.R. CO. C  Form 07 |
|---|---|
| PASSENGER'S RECEIPT for one first class continuous ticket going between stations punched on ticket. THIS RECEIPT must be detached by conductor and returned to passenger to insure ride to destination. TICKET RECEIPT NOT GOOD FOR PASSAGE | A  ISSUED March 17, 1903. TO C.M. Theobald. RETURNED March 31, 1903. C.M. Theobald COND. |

Fig. 2.

WITNESSES:
Matthew Siebler
Carolyn M. Theobald.

INVENTOR
Jno. F. Ohmer
BY R.J. McCarty
ATTORNEY

THE NORRIS PETERS CO., WASHINGTON, D. C.

No. 827,990.　　　　　　　　　　　　　　PATENTED AUG. 7, 1906.
J. F. OHMER.
DUPLEX RAILROAD TICKET.
APPLICATION FILED APR. 29, 1903.

3 SHEETS—SHEET 3.

| NO. 1760. | Form 17 |
|---|---|
| O.F.R. CO. | |
| PASSENGERS RECEIPT | |
| For one first class ticket | |
| DAYTON to TROY | |
| This receipt must be detached from the ticket by the conductor and returned to passenger to insure ride to destination. | |
| TICKET RECEIPT. NOT GOOD FOR PASSAGE. | |

| NO. 1760 | Form 17 |
|---|---|
| O.F.R. CO. | |
| This cupon ticket is good for one first class passage | |
| DAYTON to TROY | |
| when properly stamped by selling agent, and presented attached to PASSENGER RECEIPT. | |
| NOT GOOD if detached from PASSENGER RECEIPT. | |

*Fig. 3.*

| NO. 1761 | Form 16 |
|---|---|
| O.F.R. CO. | |
| PASSENGERS RECEIPT for one first class ticket returning | |
| DAYTON to MIAMISBURG | |
| This receipt must be detached from the return ticket by conductor and returned to passenger to insure ride to destination | |
| TICKET RECEIPT. NOT GOOD FOR PASSAGE. | |

| NO. 1761 | Form 16 |
|---|---|
| O.F.R. CO. | |
| Return ticket | |
| This cupon ticket is good for one first class passage returning | |
| DAYTON to MIAMISBURG | |
| when properly stamped by selling agent, and presented attached to PASSENGER RECEIPT. | |
| NOT GOOD if detached from PASSENGER RECEIPT. | |

| NO. 1761. | Form 16 |
|---|---|
| O.F.R. CO. | |
| PASSENGER RECEIPT for one one first class ticket going | |
| MIAMISBURG to DAYTON | |
| This receipt must be detached from the going ticket by conductor and returned to passenger to insure ride to destination. | |
| TICKET RECEIPT. NOT GOOD FOR PASSAGE. | |

| NO. 1761. | Form 16 |
|---|---|
| O.F.R. CO. | |
| This cupon ticket is good for one first class passage going | |
| MIAMISBURG to DAYTON. | |
| when properly stamped by selling agent and presented attached to PASSENGER RECEIPT | |
| NOT GOOD if detached from PASSENGER RECEIPT. | |

*Fig. 4.*

WITNESSES:
Matthew Subler
Carolyn M. Theobald.

Jno. F. Ohmer,
INVENTOR

BY R. J. McCarty
his ATTORNEY

UNITED STATES PATENT OFFICE.

JOHN F. OHMER, OF DAYTON, OHIO, ASSIGNOR TO OHMER FARE REGISTER CO., OF ROCHESTER, N. Y.

DUPLEX RAILROAD-TICKET.

No. 827,990.　　　　Specification of Letters Patent.　　　　Patented Aug. 7, 1906.

Application filed April 29, 1903. Serial No. 154,739.

*To all whom it may concern:*

Be it known that I, JOHN F. OHMER, a citizen of the United States, residing at Dayton, in the county of Montgomery and State of Ohio, have invented certain new and useful Improvements in Duplex Railroad-Tickets; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention comprises a form of duplex ticket designed particularly for the use of conductors on railway-trains; but it may also be used for collectors and others issuing cash receipts.

The object of the invention is to provide means whereby the going and return passage from one station to another may be sold by the conductors on trains, said means so arranged that one form of ticket only is necessary to cover an unlimited number of stations from which and to which it is desirable to collect transportation. In other words, by means of my improved ticket-form it is possible to include in one ticket the name of each and every station between the two terminals of any road. These tickets are placed in the hands of conductors in the form of tablets, and the conductors perform the duties of ticket agents as well as their own duties, and thus the necessity of employing station ticket agents is dispensed with. This is an item of economy in the running expenses of a railroad that will not be underestimated.

Of course it will be understood that I do not include within the scope of my invention the mere printing of duplex tickets, as I am aware that duplex tickets, broadly speaking, are in common use on railway-trains and in other places; but it is well known that the common form of duplex ticket sold usually by conductors on trains as well as by the station ticket agents is subject to resale and manipulation by them, thereby entailing a great loss to the companies issuing such tickets.

Broadly speaking, therefore, it is the prime object of my invention to provide a duplex ticket which cannot be subjected to resale or manipulation by the agent or conductor originally selling or issuing such tickets or by any one else. To this end I provide a ticket simple in form with the various destinations, including the two terminal points, indicated thereon and the various fares or valuations of transportation between said points of destination also indicated thereon, together with the dates, including the years, months, and days, proper indications for half-fare passage, together with indications of excess baggage, express, freight, or other articles of transportation. The ticket is further provided with letters indicating the direction, as "N., E., S., W." In addition to the above features of the ticket it is also provided with an attached form which serves the purpose of a passenger's receipt and must be detached by the conductor in collecting the tickets from the passengers and returned to the passengers to insure the passage to the destination. The destination is indicated by the punch, as is also the date, cost of ticket, direction of train, &c. The conductor when collecting a return-ticket detaches the receipt and hands it to the passenger, himself retaining the ticket, said ticket having marked thereon prominently "Not good if detached from passenger-receipt." It will therefore be seen that the ticket so collected with the passenger's receipt detached will have no value excepting for the first and original passage. Therefore it cannot be resold by the conductor or others receiving the same. In other words, the ticket is only good for the passage indicated thereon when it is attached to the passenger's receipt. This is only when it is in the hands of the original user.

A further object of my improved ticket system is to provide for the passenger a numbered receipt corresponding to the number of his ticket and which receipt when held by the passenger insures his ride to destination, the form of passenger's receipt having no value beyond the continuous passage as indicated upon the ticket from which it is detached.

While I have stated hereinbefore that my improved ticket-form enables the usual ticket agents to be dispensed with, it may also be stated that the said ticket-form does not necessarily dispense with the employment of ticket agents at stations, as the same may be sold by agents as well as conductors on trains.

Proceeding to a further detail description of my invention, reference is made to the accompanying drawings, of which—

Figure 1 is an enlarged plan view of my improved duplex-ticket form designed for use by conductors on trains. The ticket shown in this view is a return-ticket. Fig. 2 is a view similar to Fig. 1, showing my improved ticket-form adapted to a one-way passage. Fig. 3 is a plan view of a modified form of my improved ticket adapting it to the uses of steam-railroads as well as traction-lines or interurban transit The ticket shown in this view is a one-way ticket, the indications thereon being limited to the specific stations or points of destination. Fig. 4 is a modification of the ticket shown in Fig. 3 for a two-way passage.

While I have shown in the drawings some modifications of my improved form of ticket, it may be stated that they all possess one of the main features of the invention—namely, the form of passenger-receipt which invalidates the ticket after being detached therefrom, so that the ticket becomes of no further value and cannot become a means of speculation in the hands of ticket brokers and others.

Referring to Fig. 1, the ticket shown is, as before stated, made in duplex form folded longitudinally on the perforated line A and bound in the form of tablets. The tickets so mounted are consecutively numbered and provided with two headings B and C, the former of which when detached from the body of the ticket is delivered to the passenger and is good for return passage, and the other heading—to wit, C—remains in the stub, together with the duplicate ticket which it forms the heading of. The heading C is retained by the conductor in the stub, with the duplicate return-ticket attached and from which his record is made up. Upon this retained stub C, which is attached to the duplicate return-ticket, is provided the number of the duplex ticket, space for the insertion of date of issuance of the tablet, space for the insertion of the name of the conductor or agent to whom the tablet is issued, space for the insertion of date upon which the tablet is returned, and space for the insertion of the name of the conductor or agent returning said tablet. There is thus provided means for making a report covering the period from the time the tablet or portion of the tablet of tickets is issued to the time the tablet or portion of the tablet is returned, with the name of the conductor or other agent marked thereon. The heading B, which constitutes, as before stated, a passenger's receipt, has upon it the number of the ticket corresponding with the number on the stub or heading C, and other matter is placed thereon to indicate that the same constitutes a passenger's receipt for one first-class continuous ticket, returning between the stations punched on the ticket, and when presented by passenger for return passage the said receipt is then detached by the conductor and returned to passenger and insures his ride to destination.

Referring now to the body of the ticket, the essential features constitute a series of columns and spaces in which suitable indications are arranged as follows: A column D, extending approximately throughout the length of the ticket in which are arranged the various stations between the two terminal points of the particular road or line upon which the ticket is used. This column D is headed "Return-ticket" in cases where the tickets are good for return passage, as in Fig. 1, or the said heading may comprise the words "One-way-going" ticket where the ticket is for one-way passage, as in Fig. 2. Arranged parallel with the destination-column D are two columns E E', which contain figures indicating the passage or fares in money values between the various points indicated in column D. One of these columns is for use for "Going" passage and the other is for use in "Return" passage. For example, when the ticket is sold for passage between Dayton and Cincinnati the points are punched by the conductor or selling agent and at the same time the figures "150" in the top space of column E is also punched. These indicate the price of the ticket. At the top of the columns E E' there are placed the letters "N., E., W., S." to be punched to indicate the direction of the point of destination. Further columns F F', extending approximately the length of the ticket, contain the various dates to be punched to indicate the selling date of the ticket, and month, day, and year. If the ticket is a limited ticket, the return date may also be punched, thus showing the period of time covered by said ticket. The ticket also has suitable spaces indicating other than passenger traffic. For example, within said spaces are the words "Excess baggage," "Express," "Freight." The ticket may thus be used for passenger traffic or baggage, freight, or express traffic. When said ticket is used for a half-fare passenger, the space indicated by the words "Half-fare" is punched. When the passenger is traveling on a full-fare ticket, the punch is omitted from this half-fare space. When the ticket is used alone for traffic other than passenger traffic—for example, excess baggage or express—the space indicating excess baggage or express is punched; also, the proper number in the columns indicated by F' is punched to indicate the number of pieces of such baggage or express, and the proper amount is punched from the columns E or E' to indicate the amount of charges paid for such transportation.

The form of ticket shown in Fig. 2 is substantially the same as that shown in Fig. 1, the only exception being the substitution of the words "One-way-going" ticket for the words "Return-ticket," as noted at the top of the ticket; also, the passenger's receipt contains the word "Going" instead of "Returning," as in Fig. 1. Referring further to Fig. 1, upon which is noted the columns E E' to designate amount of fare paid, it may be stated that these columns with the various amounts may be eliminated from the form and the punching of the station-names only will suffice, as it is readily understood the conductor or agent may have a private price-list of the fares between stations or they may be known mentally. In either case it would be unnecessary to have the amounts of each fare appear on the ticket. It is thought, however, that the features of the ticket as shown in Fig. 1 are preferable.

The operation of my improved duplex form of ticket is as follows: The conductor having first provided himself from the office with a tablet or tablets of duplex tickets takes his train or car November 7, 1903. The first passenger on board desires to pay a passage from Dayton to Cincinnati and return. The conductor punches the ticket through the duplicate, perforating the month—for example, "November"—the day—for example, the "7th day"—the year—for example, "1903." He then punches "Dayton," also "Cincinnati." Cincinnati being south from Dayton, he punches "S," indicating the direction, and then tears off return-ticket, giving same to the passenger. This ticket will be good as indicated on the body thereof as follows: "This ticket is good for one first-class continuous passage between the stations punched in the opposite direction from the direction punched when presented attached to passenger's receipt. Not good if detached from passenger's receipt." This ticket having been punched "South" would be good in the opposite or northerly direction, which must necessarily be from Cincinnati to Dayton. On the return passage the passenger presents the ticket he received from the going-train conductor, which is taken by him, properly punched, and the passenger's receipt portion of the ticket returned to the passenger. Since the conductor who has sold the ticket must make a settlement to the company for the amount punched, as shown by the retained stub, and as the return portion of this stub must also be turned in by the same or another conductor it would be impossible to manipulate or punch another amount indicative of the fare paid without detection. The above description, it will be understood, refers to the return duplex ticket shown in Fig. 1. The operation for the sale of tickets by station agents is in accordance with that described above, excepting that the form for agents shall be suitable, as above described in Fig. 2, for one-way-going tickets; but for return-tickets sold by agents it would be necessary to have the tablets in triplicate form. The going and return portions will be given to the passenger, each having a passenger-receipt attached, the triplicate to be retained by the agent who sells the ticket with the form C attached. It will be understood when a record is made for excess baggage, express, or freight a separate ticket of the duplex form is used—that is to say, one of the tickets shown either in Fig. 1 or Fig. 2 is used for that purpose alone. In that case all printed matter both on the receipt B and the body of the ticket indicating passenger traffic would be eliminated and matter referring alone to baggage, freight, express, and other similar traffic would be substituted. In other words, only such changes would be made in the duplex-ticket form as would be necessary to adapt it to the purposes of excess baggage, express, or freight transportation. In either event the receipt B is a necessary feature of my improved duplex-ticket form.

My improved duplex form of ticket, as hereinbefore described, it will be borne in mind, serves the purpose of as many individual tickets as there are names of stations indicated thereon. It will also be remembered, in addition to this useful feature, a passenger's receipt is made an integral part of such ticket. A ticket constructed in accordance with this form renders it unnecessary to occupy the great amount of space in the ticket-agent's office where my improved duplex ticket is placed in the hands of agents. For example, in the sale of individual tickets or tickets between two points a very spacious ticket rack or holder is necessary, with a number of individual compartments arranged one row above another for holding the different tickets. In checking up agents the traveling auditor is required to visit the various ticket-offices along the line of road and go through these ticket-racks to count the missing tickets from each compartment to ascertain the number of tickets sold by each particular agent and the various points to which said tickets were sold. It will be borne in mind that when the rack-compartments are filled a certain number of tickets is placed in each compartment and a note is taken thereof. This troublesome and otherwise inconvenient system of keeping tickets on sale and of checking up ticket agents is entirely avoided by the use of my improved duplex ticket. In the use of my duplex ticket it will be seen that each ticket is to all intents and purposes an individual ticket for each and every point named thereon. This obviates the necessity of ticket-racks to hold a multiplicity of individual tickets, and, further, the retained stubs of each tablet make up a full and complete record of the sale of each and every ticket from that tablet. Instead of the traveling auditor being compelled to go from agent to agent to examine through these various ticket-racks the stub of each tablet may be sent to the auditor's office and there the work of the ticket agent or the conductor checked up as fully and completely as possible. While I have thus illustrated the idea of the passenger's receipt in connection with a duplex ticket upon which are indicated all of the stations on a line or road between the two terminals, I wish to state that the idea of this passenger's receipt is not confined alone to that form of ticket; but it may be employed with individual tickets, both of the one-way kind and the return kind, as shown in Figs. 3 and 4. The ticket, as shown in Fig. 3, consists of the ticket proper and the attached receipt divided by the perforated line. This ticket, it will be seen, is good from Dayton to Troy, and if sold by an agent it is delivered to the purchaser with the two parts united. If the conductor sells such ticket, he detaches the receipt and hands the same to the passenger, himself retaining the ticket proper, or in collecting a ticket from a passenger who has purchased the same from an agent the conductor also detaches the passenger's receipt and delivers it to the passenger and takes up the ticket. In a return-ticket there are two of such passenger-receipts H H', which are united to the going and returning coupons I I'. The conductor on the going train detaches the going coupon I' and punches the going receipt H', delivering the balance of the ticket to the passenger. On the return-train the conductor likewise detaches the return-coupon I, which remains attached to the going passenger-receipt, and delivers the returning passenger-receipt to the passenger. It will thus be seen that it is impossible for any valuable portion of the railroad-ticket to find its way into the hands of ticket brokers and others who make it a business to trade in railroad-tickets at reduced rates, much to the detriment of the railroad-company issuing such tickets.

Having described my invention, I claim—

In a duplex traffic-ticket, a duplex ticket separated longitudinally by a weakened line and each ticket bearing on the face thereof its number and duplicate indications denoting the various points of destination between two terminals, the various rates of fares, the various dates upon which said tickets are sold, the direction of each point of destination, headings for said duplicate tickets one of which is separated transversely from the ticket by a weakened line, said headings bearing the numbers of the tickets, one of said headings together with its attached ticket being detachable on the longitudinal perforated line, and a heading being detachable from the ticket when the latter is taken up by the conductor and upon which heading there is indicated that the same constitutes a passenger's receipt good for return passage.

In testimony whereof I affix my signature in presence of two witnesses.

JOHN F. OHMER.

Witnesses:
R. J. McCarty,
Carolyn M. Theobald.